PANORAMIC RECEIVER FREQUENCY MARKER SYSTEM

Filed April 17, 1946 4 Sheets-Sheet 1

Inventor
JOSIAH J. GODBEY
By M. A. Hayes
Attorney

Aug. 15, 1950 J. J. GODBEY 2,518,461

PANORAMIC RECEIVER FREQUENCY MARKER SYSTEM

Filed April 17, 1946 4 Sheets-Sheet 2

Inventor

JOSIAH J. GODBEY

By M. A. Hayes

Attorney

Aug. 15, 1950 J. J. GODBEY 2,518,461

PANORAMIC RECEIVER FREQUENCY MARKER SYSTEM

Filed April 17, 1946 4 Sheets-Sheet 3

Inventor
JOSIAH J. GODBEY

By M. A. Hayes
Attorney

Aug. 15, 1950 J. J. GODBEY 2,518,461

PANORAMIC RECEIVER FREQUENCY MARKER SYSTEM

Filed April 17, 1946 4 Sheets-Sheet 4

Inventor

JOSIAH J. GODBEY

By M. C. Hayes

Attorney

Patented Aug. 15, 1950 2,518,461

UNITED STATES PATENT OFFICE 2,518,461

PANORAMIC RECEIVER FREQUENCY MARKER SYSTEM

Josiah J. Godbey, Dallas, Tex.

Application April 17, 1946, Serial No. 662,769

8 Claims. (Cl. 250—20)

(Granted under the act of March 3, 1883, as amended April 30, 1928; 370 O. G. 757)

This invention relates broadly to radio systems and more specifically to a panoramic system of radio reception.

In accordance with the present invention the local oscillator of a conventional type superheterodyne receiver is beat against the local oscillator of a panoramic type superheterodyne receiver and the resulting beat frequency signal is applied as a marker signal to the cathode-ray indicator of the panoramic receiver. The purpose of this marker signal is to provide immediate, and accurate, visual apprisal as to which one of a number of signals received by the panoramic receiver, as it sweeps through a predetermined portion of the frequency spectrum, is being monitored by the conventional superheterodyne receiver. Thus a marker signal system is contemplated which permits the marker signal to be so displayed on the cathode-ray tube indicator of a panoramic receiver as to be readily distinguishable from incoming signals received by the panoramic receiver. Additionally, this system permits the marker signal to be isolated from incoming signals so that the appearance of the incoming signal under consideration will not be distorted by the superposition of the marker signal upon it.

Included in the circuits contemplated for the marker signal system is an amplifier stage tuned to resonate over a constant frequency band such that beat frequency signals will be selected and amplified when the panoramic local oscillator sweeps through a finite band of frequencies on each side of the instantaneous frequency of the superheterodyne local oscillator. Thus, two marker signals produced as taught by the present invention appear along the display trace at such a position that they bracket the frequency to which the conventional superheterodyne receiver is tuned.

Accordingly, it is an object of this invention to provide for a panoramic receiver a signal marker system having the advantages hereinabove mentioned.

It is another object of this invention to provide for a panoramic receiver system a signal marker which has the property of being readily distinguishable from incoming signals.

It is a further object of this invention to provide for a panoramic receiver a signal marker for providing instantaneous and accurate apprisal of the tuning of an auxiliary receiving means.

Still another object of this invention is to provide in a panoramic receiver a signal marker system whose amplitude will remain constant over the frequency spectrum being scanned by the panoramic receiver.

Other objects and advantages of the invention will be apparent from the following detailed description when taken in conjunction with the accompanying drawings which are preferred embodiments of the invention and in which.

Figure 1:
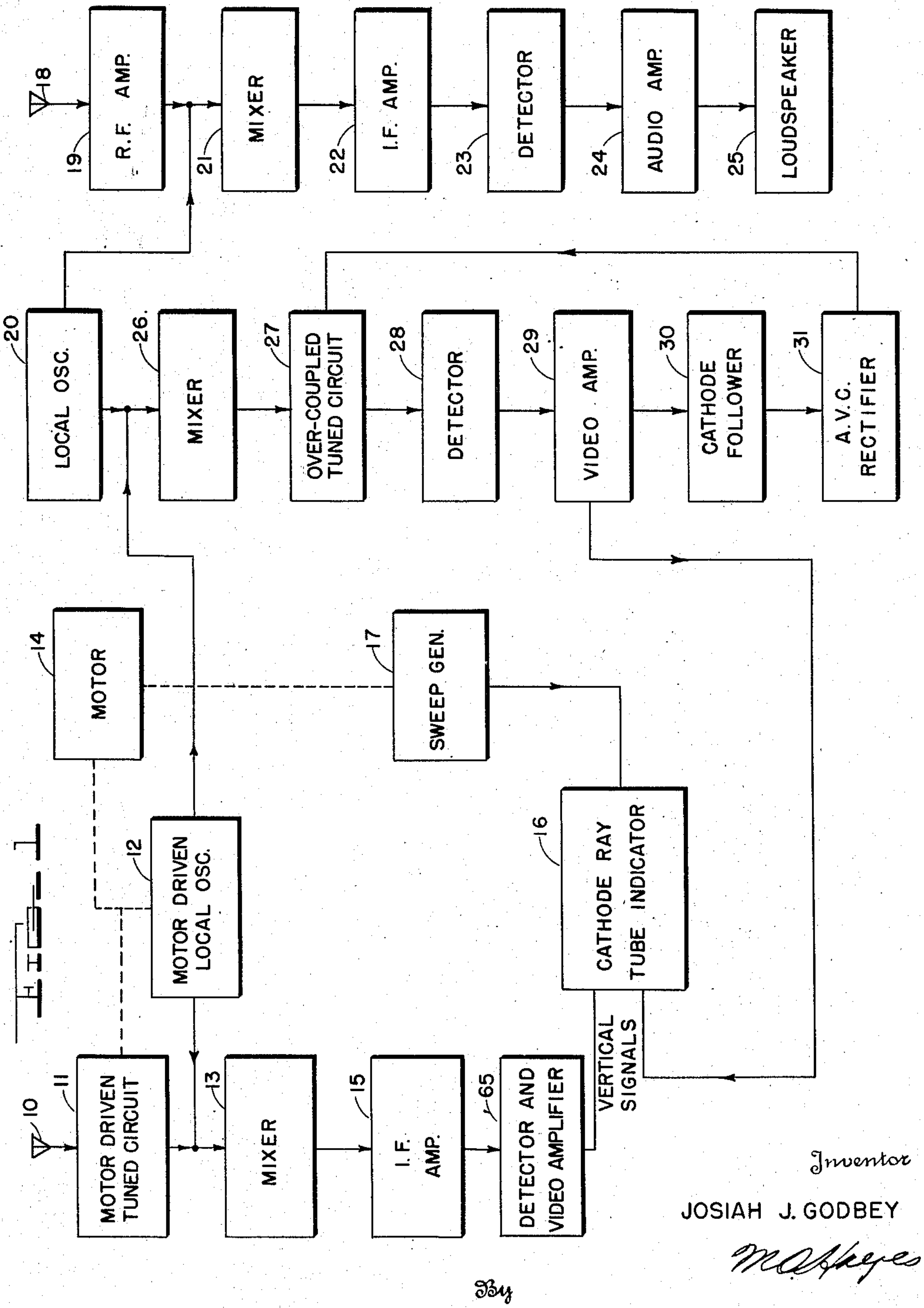
Fig. 1 is a block diagram of one embodiment of the invention.
Figure 4:
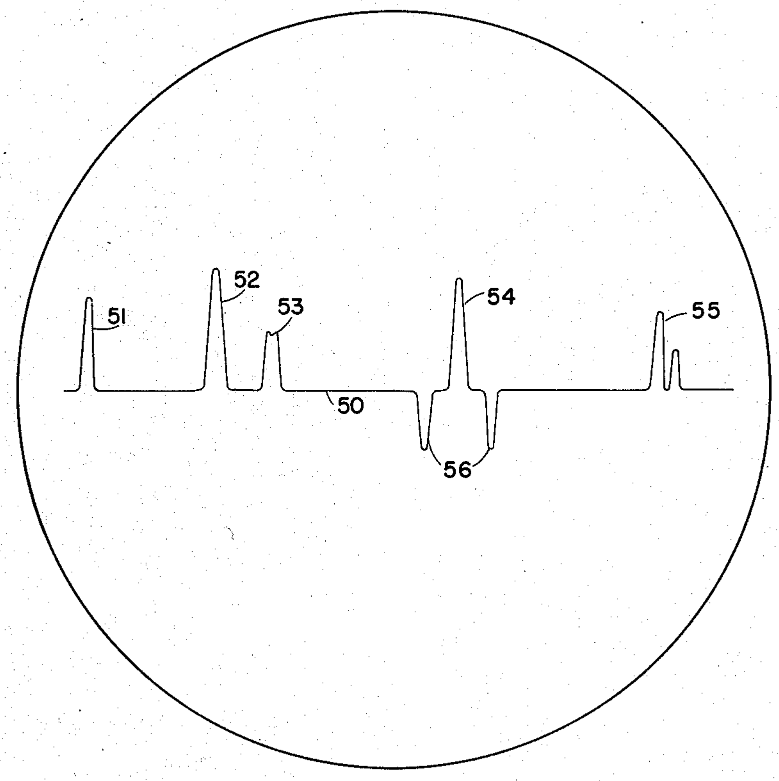
Fig. 4 is a typical diagram showing the waveform of a multiplicity of signals, including the marker signal, reproduced on the screen of the cathode-ray tube indicator of the panoramic receiver.

Referring more specifically to the accompanying drawings, a combination visual-aural panoramic receiver arrangement is shown in Fig. 1. The signals seen on the screen of the cathode-ray tube indicator 16 are introduced to the antenna 10 of the panoramic receiver and are selectively chosen to pass into the frequency mixer stage 13, the intermediate amplifier stage 15, and the detector and video amplifier stage 65 by a tuned circuit 11 whose resonant frequency is varied periodically over a predetermined portion of the frequency spectrum. The periodic tuning results from a motor 14 which drives, for instance, the variable condenser of the tuned circuit 11. The motor 14 also varies the frequency of the local oscillator 12 so that the oscillator frequency tracks with the resonant frequency of the tuned circuit 11 and a constant beat frequency signal will result. Simultaneously, a sweep circuit 17 of the type ordinarily employed in oscilloscopic displays is actuated by the motor 14 so as to cause the electron beam of the cathode-ray tube 16 to trace a horizontal line synchronously with the tuning sweep of tuned circuit 11 and the local oscillator 12. Thus the position of each signal impinging on antenna 10 is caused to appear on the visual screen of the cathode-ray tube 16 as a direct function of its frequency. That is, in reference to Fig. 4 where a face view of the screen of cathode-ray tube indicator 16 is shown, the horizontal line 50 represents the trace of the electron beam caused by the sweep circuit 17, and vertical excursions 51 through 55 represent indications of incoming signals of different frequencies. For instance, in the case where the beam moves from left to right and the tuning is from the low end to the high end of the frequency band, the signal 51 will have the lowest frequency; signal 55 will have the highest frequency; and signals 52, 53 and 54 will be signals of frequencies intermediate to the frequencies of signals 51 and 55, with their position along sweep 50 being directly dependent on the value of their frequency.

The aural part of the combination visual-aural setup is represented by a superheterodyne type of receiver arranged according to the usual methods, in which there is a radio frequency tuned circuit 19, a local oscillator 20, a frequency mixer stage 21 followed by an intermediate frequency amplifier stage 22, a detector 23, and finally the audio amplification stages 24, the output from which is connected to a means for aural reproduction such as the loudspeaker 25.

In this system, the marker signal is obtained by mixing the local oscillator 20 of the conventional superheterodyne receiver and the local oscillator 12 of the panoramic receiver in the frequency mixing circuit 26. The beat frequency output is then introduced to a tuned transformer-coupled amplifier 27 which is slightly over-coupled so that the amplifier will pass a band of signals on either side of the frequency to which it is tuned. A detector stage 28 follows the transformer-coupled amplifier 27 and the detected signal is amplified and inverted in the video amplifier 29. The marker signal is obtained from the output of the video amplifier 29 and is applied to the vertical deflection plate of the cathode-ray tube 16 opposite that which receives the incoming signals from the panoramic receiver. Thus the marker signal will appear below the horizontal sweep trace 50 on the cathode-ray tube indicator 16 and therefore be readily distinguishable from the incoming signals applied thereto by the panoramic receiver. A cathode-follower stage 30 and automatic volume control rectifier stage 31 arranged to control the gain of the over-coupled amplifier are included to maintain the marker signal at constant amplitude. The output from the automatic volume control rectifier stage is fed back to the over-coupled amplifier 27. The marker signal appears in Fig. 4 as the double-humped signal 56 below the horizontal sweep line 50. This double-humped marker signal results from the transformer-coupled amplifier stage 27 being resonant at some intermediate frequency, for example, 100 kc. Thus, as the panoramic local oscillator 12 sweeps through its frequency range, it will cause the amplifier stage 27 to pass signals when the frequency of the local oscillator 12 is 100 kc. below and 100 kc. above the frequency of the superheterodyne local oscillator 20. Since the pass band of the amplifier 27 is relatively narrow, two distinct marker signals will be developed, the pair bracketing a position along the trace 50 corresponding to the frequency to which the conventional superheterodyne receiver is tuned.

Figure 2:
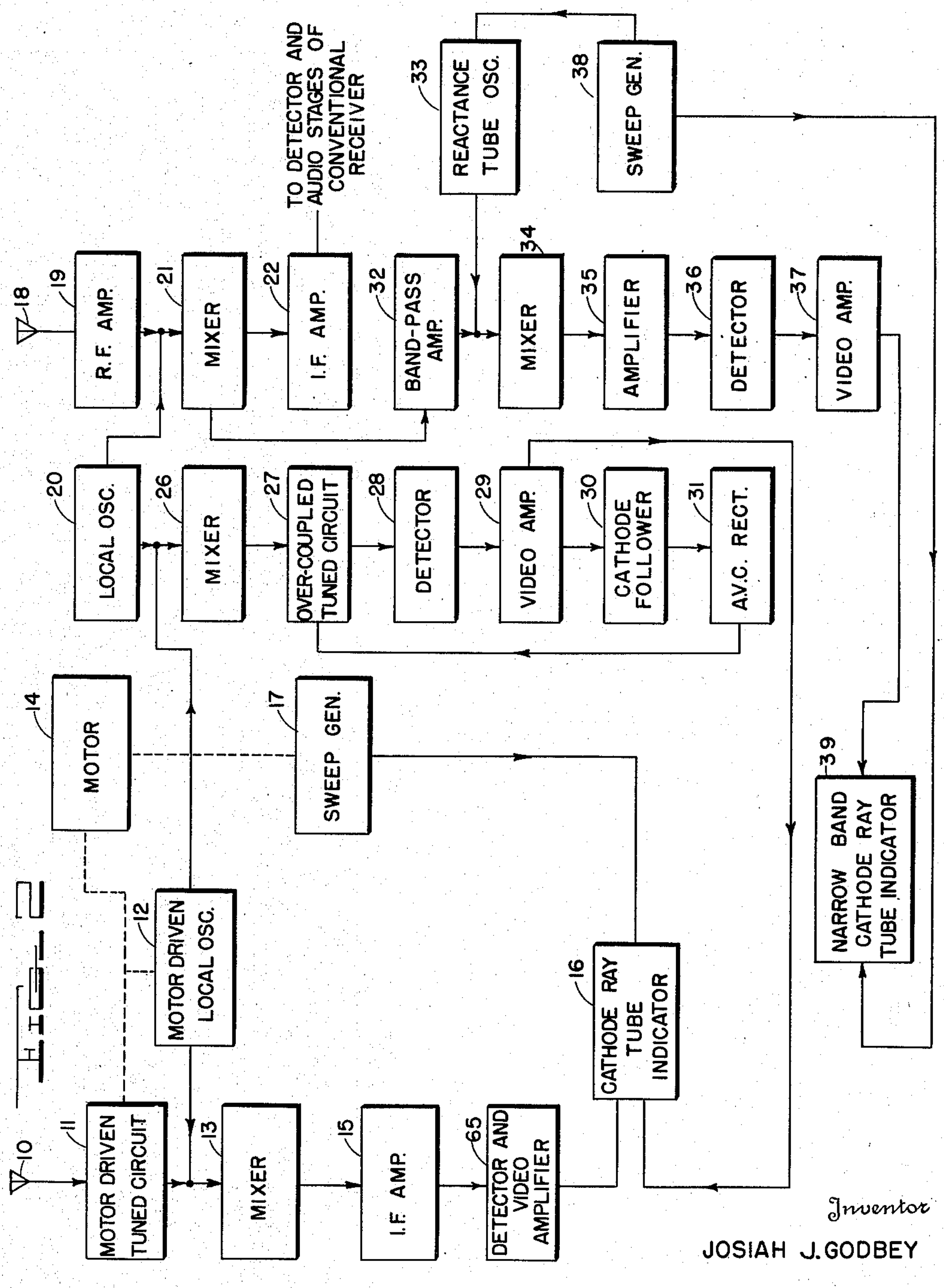
Fig. 2 is a block diagram of an alternate embodiment of the invention.

In Fig. 2, an alternate embodiment of the invention is shown, in which the purpose of the arrangement is to amplify on a separate cathode-ray tube indicator 39 a portion of the frequency spectrum being swept by the panoramic receiver and to identify by a marker signal appearing on wide band display 16 the part of the frequency spectrum being amplified. As in Fig. 1, a superheterodyne type of receiver arranged according to the usual methods may be used to receive the incoming signals and convert them to signals of an intermediate frequency. The intermediate frequency signals may then be fed to a panoramic adaptor unit which comprises a band-pass amplifier 32. Since it is desired to amplify on a separate cathode-ray tube a portion of the frequency spectrum being swept by the panoramic receiver and since the R. F. amplifier stage 19 of the superheterodyne receiver will tend to discriminate against signals on either side of the receiver frequency as against the receiver frequency itself, the band-pass amplifier 32 is so designed that its frequency response will compensate for the discrimination presented by the amplifier 19 to signals whose frequencies are different than the receiver frequency. Thus a true picture will be presented of the signal amplitudes on the portion of the frequency spectrum being amplified. A reactance tube oscillator 33 is used to beat against the signals from the amplifier 32, the output being mixed in the frequency mixer stage 34. A selective frequency amplifier stage 35 follows and this is in turn followed by a detector 36 and a video amplifier 37. The signals appearing on the screen of the cathode-ray tube indicator 39 are applied to the vertical plates of the oscilloscope cathode-ray tube from the output of the video amplifier 37. Since the horizontal sweep of the narrow-band indicator 39 is produced by the sawtooth sweep generator 38 and since a portion of the sweep generator voltage is introduced to the grid of the reactance tube of the oscillator 33, the position of the signals appearing on the narrow-band indicator 39 is a direct indication of their relative frequencies.

The marker signal is generated by the same system as shown in Fig. 1, consisting of the motor driven local oscillator 12, the superheterodyne local oscillator 20, the mixer stage 26, the transformer-coupled amplifier 27 followed by the detector 28 and the video amplifier 29, from the output of which the marker signal is taken. A cathode follower 30 and A. V. C. rectifier 31 are again included to stabilize the amplitude of the marker signal. The marker signal appears on the screen of the indicator 16 and shows what portion of the frequency spectrum being viewed on the oscilloscope 16 is being amplified in the indicator 39.

Figure 3:
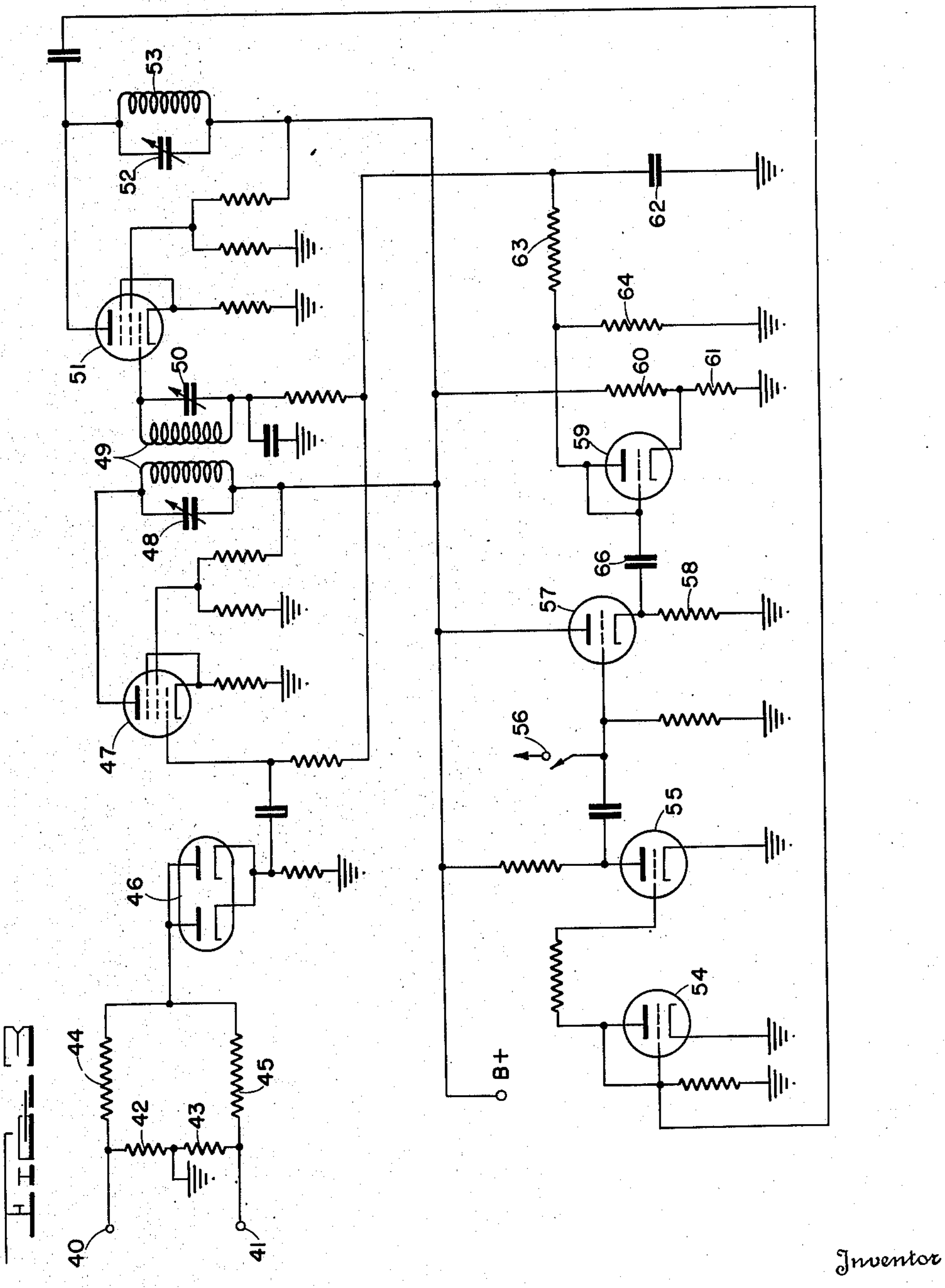
Fig. 3 is a simplified schematic circuit diagram of a part of the apparatus shown in Figs. 1 and 2.

The simplified schematic circuit diagram of the marker signal system is shown in Fig. 3. The signals from the local oscillator 12 of the panoramic receiver and the local oscillator 20 of the conventional superheterodyne receiver are introduced at the terminals 40 and 41, respectively, of Fig. 3 and are then matched and decoupled in the network comprising resistors 42, 43, 44 and 45. The signals are then mixed in the twin-diode 46 and applied to the control grid of the pentode tube 47 in the transformer-coupled amplifier stage shown in Fig. 1. The transformer 49 in the amplifier stage 27 is slightly over-coupled to provide increased band width and is double tuned by the condensers 48 and 50. Increased band width is provided so that the amplifier stage 27 can be made to have a longer time-period of response as the panoramic local oscillator 12 rapidly sweeps through the frequencies which will react with the signal from the local oscillator 20 to produce the marker signal. Thus, as the panoramic oscillator signal introduced at terminal 40 sweeps through the predetermined portion of the frequency spectrum, it will effect a double-humped signal at the output of the transformer-coupled amplifier, with the center of the trough between said humps occurring at the frequency of the superheterodyne local oscillator. Since two local oscillators differing from the received frequency by an equal intermediate frequency are used, it is not required that there be a separate (or special) fixed oscillator of the intermediate frequency which will mix with the local oscillator of the receiver and correct for the difference between the local oscillator frequency and the frequency the receiver is tuned to accept. It is required, however, that both local oscillators operate on the same side, that is, above or below the tuned input frequency.

A single-tuned amplifier stage resonant at 100 kc., comprising the pentode tube 51, the condenser 52 and inductance 53 further amplifies the output of the transformer coupled stage. The amplifier marker signal is then detected in the tube 54 and amplified in the triode 55 before being applied to the vertical deflection plate of the cathode-ray tube through the lead 56. A portion of the output from the triode 55 in the video amplifier stage 29 is also applied to the grid of the tube 57 in the cathode-follower stage 30, as shown in Fig. 1. This stage serves as a buffer stage between the video stage and an A. V. C. rectifier stage. The output from the cathode-follower circuit is derived across the resistor 58 and this output is impressed on the anode of the A. V. C. rectifier tube 59, a diode-connected triode. The cathode of the tube 59 is biased positive by the resistors 60 and 61 so that the tube 59 will not conduct until a signal of greater positive voltage than the bias voltage is impressed on the plate. Thus, if a marker signal appearing on the plate of tube 59 should cause the plate to become positive with respect to the cathode, the tube will conduct through the resistance 61, charging the condenser 66. When the signal is removed, the condenser 66 will then discharge through the filter consisting of the resistances 63 and 64 and the condenser 62 until the next marker signal appears. This discharge produces a negative voltage across the condenser 62 and its purpose is to prevent the bias voltages on the grids of the tubes 47 and 51 from becoming too low. The resistance 64 is chosen to have a high value with respect to the resistance 61, so that the charge on the condenser 66 may approach peak value on the first pulse signal but decay only slightly between successive signals. Weak signals which do not overcome the cathode bias of the tube 59 and thus charge the condenser 66 produce no A. V. C. voltage, since they are effectively short-circuited by the condenser 62, which has a low impedance with respect to the grid impedances of the tubes 47 and 51.

While certain preferred embodiments of this invention have been described, it is realized that many modifications and variations of this invention may be made and no limitations upon this invention are intended other than may be imposed by the scope of the appended claims.

The invention described herein may be manufactured and used by or for the Government of the United States of America for governmental purposes without the payment of any royalties thereon or therefor.

What is claimed is:

1. In combination, a panoramic receiving system having a local oscillator therefor and a visual indicator, an auxiliary superheterodyne aural receiver also having a local oscillator, means for mixing the local oscillator frequencies of said panoramic receiver and said auxiliary superheterodyne receiver together to produce a beat frequency difference component and means including a frequency selective circuit for applying only those beat frequency signals lying within a predetermined frequency range and obtained from the output of said last named means to the visual indicator of said panoramic receiver.

2. In combination, a panoramic receiving system having a local oscillator therefor and a visual indicator, an auxiliary superheterodyne aural receiver also having a local oscillator, means for indicating the tuning of said auxiliary superheterodyne receiver comprising means for mixing the local oscillator frequencies of said panoramic receiver and said auxiliary superheterodyne receiver together to produce a beat frequency difference component, means including a frequency selective circuit and a detector circuit for applying only those beat frequency signals lying within a predetermined frequency range and obtained from the output of said mixing means to the visual indicator of said panoramic receiver.

3. In combination, a panoramic receiving system having a periodic frequency sweeping local oscillator therefor and a visual indicator, an auxiliary superheterodyne receiver also having a local oscillator, said local oscillators being tuned to produce similar intermediate frequency carriers in their respective receiver channels, means for mixing the signals of said local oscillators to produce a beat frequency difference component, band pass circuits for accepting only said beat frequency signals coming within a specific beat frequency range, and means for detecting and applying the output of said band pass circuits to the visual indicator of said panoramic receiving system.

4. In the combination set-forth in claim 3, the last named means comprising an over-coupled transformer coupled amplifier tuned to pass only beat frequencies lying within said specific beat frequency range.

5. In the combination set-forth in claim 3, the last named means comprising an over-coupled transformer coupled amplifier tuned to pass only beat frequencies lying within said specific beat frequency range, and an automatic gain control means operative in response to the output of said transformer coupled amplifier to automatically control the gain thereof.

6. In combination, a panoramic receiver having a periodically frequency swept local oscillator therefor and a cathode ray tube visual indicator on which the signals received by said panoramic receiver are displayed, an auxiliary superheterodyne receiver also having a local oscillator, the local oscillators of said panoramic receiver and said auxiliary receiver being tuned to provide similar intermediate frequencies for their respective receiver channels, means mixing the signals of said local oscillators to produce a beat frequency difference signal, a band pass circuit for accepting only said beat frequency difference signals lying within a predetermined range, means for detecting and applying the output from said band pass circuit to said cathode ray tube in opposition to the received signal display appearing thereon.

7. In combination, a panoramic receiver system having a periodically frequency swept local oscillator therefor and a visual indicator, an auxiliary receiver also having a local oscillator, the local oscillators of said panoramic receiver and said auxiliary receiver being tuned to provide similar intermediate frequencies in their respective receivers, means mixing the signals of said local oscillators to produce a beat frequency difference signal, an over-coupled transformer coupled amplifier tuned to pass only those beat frequency signals immediately above and below the zero beat frequency difference, and means operative to detect and apply the output of said amplifier to the visual indicator of said panoramic receiver.

8. In combination, a panoramic receiving system having a local oscillator therefor and a visual indicator, an auxiliary superheterodyne receiver also having a local oscillator, means for mixing the local oscillator frequencies of said panoramic receiver and said auxiliary superheterodyne receiver together to produce a beat frequency difference component, and means including a frequency selective circuit for applying only those beat frequency signals lying within a predetermined frequency range and obtained from the output of said last named means to the visual indicator of said panoramic receiver.

JOSIAH J. GODBEY.

REFERENCES CITED

The following references are of record in the file of this patent:

UNITED STATES PATENTS

| Number | Name | Date |
|---|---|---|
| 2,043,092 | Black | June 2, 1936 |
| 2,084,760 | Beverage | June 22, 1937 |
| 2,121,359 | Luck et al. | June 21, 1938 |
| 2,279,151 | Wallace | Apr. 7, 1942 |
| 2,367,907 | Wallace | Jan. 23, 1945 |
| 2,368,448 | Cook | Jan. 30, 1945 |
| 2,381,940 | Wallace | Aug. 14, 1945 |
| 2,409,012 | Bliss | Oct. 8, 1946 |